3,492,386
EXTENDING PROCESS AND DEVICE FOR TUBULAR FILMS OF THERMOPLASTIC SYNTHETIC RESIN

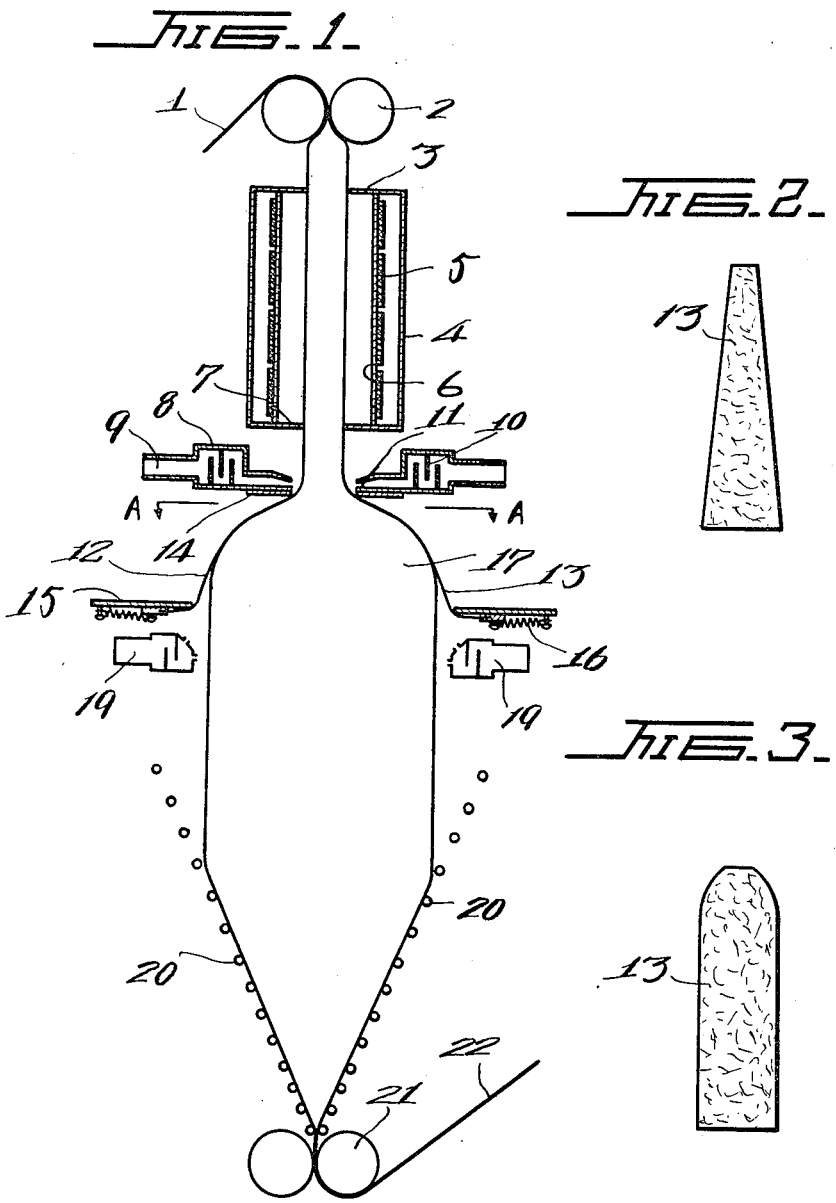

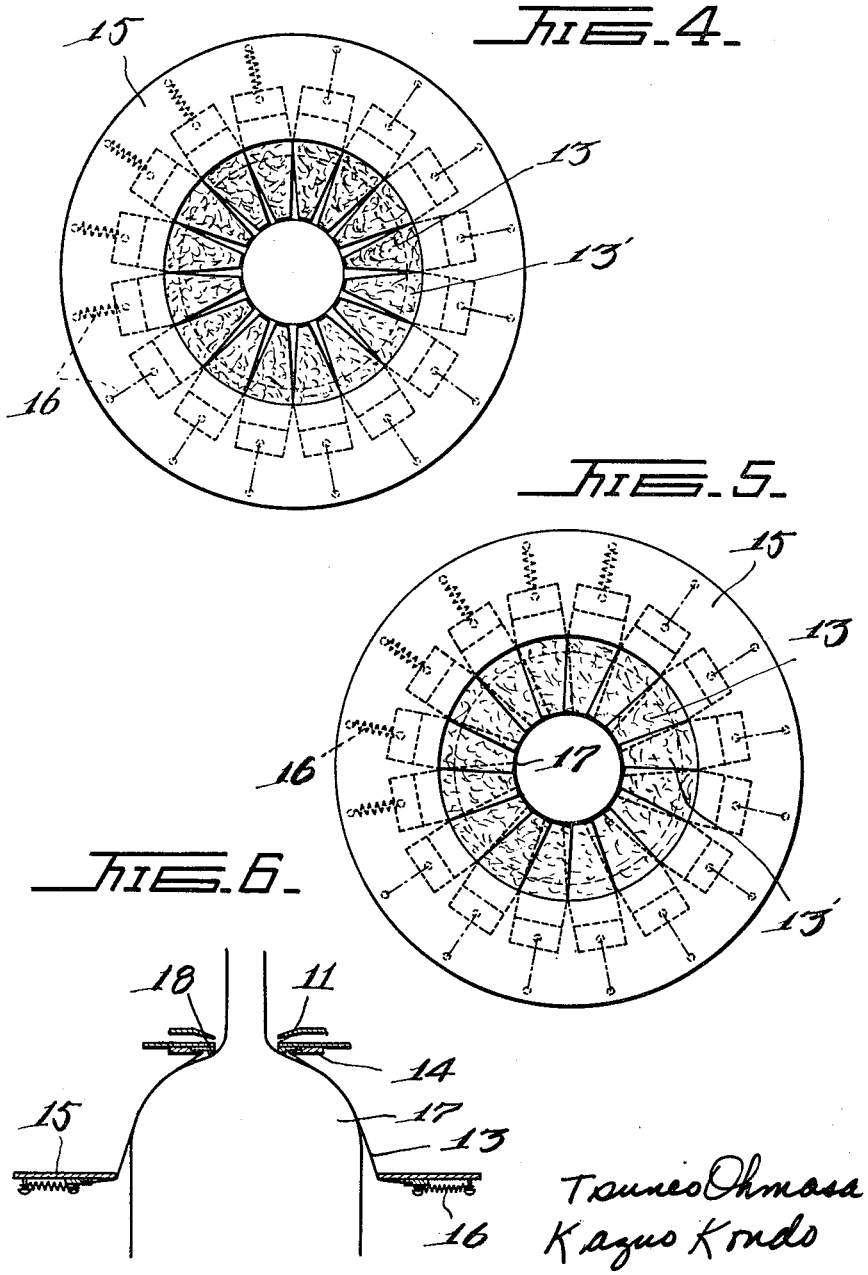

Tsuneo Ohmasa and Kazuo Kondo, Marugame-shi, Japan, assignors to Okura Kogyo Kabushiki Kaisha, Takamatsu-shi, Kagawa-ken, Japan
Filed June 6, 1967, Ser. No. 643,932
Int. Cl. B29d 23/00; B29h 7/02
U.S. Cl. 264—89     7 Claims

ABSTRACT OF THE DISCLOSURE

A process for extending tubular films of thermoplastice synthetic resin and apparatus for effecting said process, wherein a tubular film is heated and air is forced into the tubular film to expand the film and the film is simultaneously stretched longitudinally and transversely, in order to uniformly extend the tubular film of thermoplastic synthetic resin continuously and stably. The apparatus comprises a device for delivering the heating air for heating the tubular films at working temperatures by blowing the air in a narrow stream lengthwise of the tubular film, and a guiding device consisting of a plurality of sheet-like guiding members fixed at both ends and into contact with which the tubular film comes during expansion, whereby the tubular film is expanded gradually as it cools from a heated condition.

---

The present invention relates to a process for extending tubular films of thermoplastic synthetic resin in two directions, i.e. longitudinally and transversely simultaneously and uniformly by using a stream of heated air, and a device therefor.

It is well known that the properties of such films, particularly films of crystalline thermal plastic synthetic resin, can be improved by extending it in two directions, i.e. longitudinally and transversely, after heating it to a temperature below the melting temperature thereof. Various processes are known for such stretching. For instance, processes are available wherein said tubular films are heated with hot water, hot oil or heated by an infrared heater or by bringing a heated metal piece into contact therewith, and then said tubular films are expanded by forcing air into them. However, in practising such processes great skill and a precision apparatus are both required. Moreover, extending a film for an extended period of time in a stable manner is difficult and the properties of the extended film thus obtained are not always uniform.

The present invention has as an object the provision of a device for uniformly extending tubular films of thermoplastic synthetic resin continuously and stably in both the longitudinal and transverse directions. The present invention achieves this object by means of an apparatus which comprises a heated air delivery device, wherein tubular films of thermoplastic synthetic resin are heated by blowing heated air from outside of films against the tubular film along a short length of the film and in addition air is forced into the tubular film to expand it and simultaneously the tubular film is heated to the extending temperature. A guiding device is provided consisting of a plurality of flexible guide members fixed only at the ends so that said guide members contact the tubular film during expansion. The heated tubular film is gradually cooled while being expanded. The tubular film is again heated by blowing heated air against it from outside of said film and further air is forced into the tubular film to expand it and simultaneously the film is stretched longitudinally, so that is expands in two directions, that is, longitudinally and transversally.

According to the present invention, all sorts of tubular films of thermoplastic synthetic resin can be extended. It is particularly suitable for extension of tubular films of polypropylene. The thickness and width of the tubular film are not limited. Tubular films, manufactured by extrusion of thermoplastic synthetic resin can be extended directly and also tubular films can be extended even after they are unwound from a reel. Moreover, in special cases, tubular films formed from flat films by reeling or other suitable methods can be elongated.

In the following the present invention is described in detail with reference to the accompanying drawings, in which:

FIG. 1 is a longitudinal sectional view showing the device of the present invention schematically;

FIG. 2 and FIG. 3 are front views of the guide pieces used for the present invention;

FIG. 4 is a schematic plan view showing sixteen guide pieces of the type shown in FIG. 2 and taken on line A—A of FIG. 1.

FIG. 5 is a view similar to FIG. 4 but showing sixteen guide pieces of the type shown in FIG. 3; and FIG. 6 is a longitudinal sectional view of the essential portion of the apparatus.

Tubular film of thermoplastic synthetic resin 1 is fed by feeding rollers 2 revolving at a constant velocity, the tubular film being formed into a cylindrical shape by air under pressure forced into said tubular film. The film is passed through an opening in a plate 3 for protecting the cylindrical film from rolling, and, the film is preheated in a preheating device 4. The preheating may be performed, by various conventional processes, for instance, an infrared ray heating process, hot gas blast process or the like, or can be heated in a cylinder heated by a heater 5 as shown in FIG. 1. This preheating is preferably only to a temperature at which no extension will take place in the preheating range. However, it may of course be to a lower temperature. The preheated film is again passed through a rolling-preventing plate 7 for preventing rolling. The rolling-preventing plates 3 and 7 also act to retain the heat of the preheating device 4 in addition to preventing rolling of films.

The preheated film, after it has passed through the rolling-preventing plate 7, is quickly heated to a temperature suitable for orientation by air blown out of a heating air delivery device 8. The heated air for heating the film to a temperature suitable for orientation is heated in an air-heating device (not illustrated) and supplied to an inlet 9 of heated air delivery device 8 by a pumping device (not illustrated), and passes over buffer plates 10 for rectification and is blown in a uniform stream out of a nozzle 11 around the periphery of the film. The direction in which the heating air is blown, i.e. the direction of the blowing-out nozzle 11 can be at right angles to or oblique to the longitudinal axis of the film. On the other hand, the clearance between the outlet nozzle 11 and the film ranges from 2 to 20 mm., and it is preferable that it be from 3 to 10 mm., and the final diameter of the extended film should be from 1 to 3 times, preferably from 1.2 to 2 times, the diameter before expansion (or before extension). However, the method of the invention is not limited to the above-mentioned ranges. Conventional air heater and air moving devices can be used for this purpose. The temperature and quantity of heating air can be controlled easily by conventional processes and control apparatus. Moreover, heating by blowing heated air at the object can be used in combination with heating by an infrared ray heater or other type of heater.

The velocity of the film and the temperature to which it is heated can be easily controlled controlling the amount of hot air, its temperature or the clearance between the outlet nozzle and the film. If necessary, the amount of heating air can be partially controlled.

Films heated to a temperature appropriate for orientation are slowly expanded in contact with a guide member 13 forming part of guiding device 12, under the pressure of air forced into the tube formed by the film, while cooling, and the film is simultaneously extended longitudinally by a take-up roller 21 which revolves at a higher peripheral velocity than that of feeding roller 2. The film is thereby extended both longitudinally and transversally. In the guilding device 12, a plurality of flexible guiding members 13 having a shape as shown in FIG. 2 or 3 each have one end fixed just below the lower edge nozzles 11 of the heated air delivery device 8 by means of fixing plates 14, while the other ends are secured to a fixing plate 15 by springs 16. The above-mentioned guiding device 12 requires at least 4 guiding members 13, and preferably comprises at least 10 guiding members 1e. Consequently, the shape of guiding members 13 change freely depending upon the force exerted thereon by the film 17 during expansion, because the guiding members 13 are flexible. Each takes a form suitable to the expansion, in accordance with the kind and expansion rate, etc. of the tubular film. A view of the device on line A—A of FIG. 1 is shown in FIG. 4, in which 16 guiding members 13 each having a shape as shown in FIG. 2 are used, while the view of the device on line A—A of FIG. 1 is shown in FIG. 5, in which 16 guiding members 13 each having a shape as shown in FIG. 3 are used. When guiding members 13 having the shape as shown in FIG. 2 are used, clearances are formed between the guiding members 13 and 13', when they are curved by the film 17 during its expansion, while the guiding members 13 and 13' overlap each other when guiding members having the shape shown in FIG. 3 are used. Accordingly, a desirable form of guiding member 13 is selected in accordance with the kind of film, the kind of guiding members and the cooling conditions during expansion. The guiding members 13 are very soft and flexible and therefore, the friction between the guiding members 13 and films 17 during expansion is low, and materials which do not hurt the films, but have appropriate strength and flexibility can be used. Particularly, textile materials are particularly appropriate.

Another example of a manner of fixing the guiding members is shown in FIG. 6. In this case, film heated to a temperature suitable for orientation is brought first into contact with a contact piece 18 provided along the lower edge of blowing nozzle 11 of the heated air delivery device 8, and thereafter the film comes into contact with guiding members 13 and expands. The contacting member 18 should have a smooth surface so that the film is not damaged.

Films expand slowly while being cooled. When the material of the guiding members or the ambient temperature is not appropriate and the cooling velocity is not sufficient by merely using natural cooling, it is necessary to warm or cool the guiding device 12, depending on whether cooling is too rapid or too slow. In the usual cases, however, favorable results can be achieved without such added heating or cooling. Films which have been expanded and simultaneously extended longitudinally are transmitted by a cold blast delivery device (not illustrated, and cooled by a cold blast blown out of the cold blast delivery device 19 and then flattened with a flattening device 20, and drawn out of the apparatus by the taking-up roller and forwarded to following steps such as a hot set, slitting and reeling, etc.

The peripheral velocity of the taking-up roller 21, i.e. the withrdrawal velocity, is higher than the peripheral velocity of feeding roller 2, that is, feeding velocity, in order to extend the film longitudinally. The longitudinal extension rate can be freely chosen by varying either the withdrawal velocity or the feeding velocity, or both. On the other hand, the transverse extension rate can be suitably selected by appropriately choosing the amount of air or other gas forced into the space within the tubular film. Moreover, during the operation, the extension rate can be varied by changing the angle of the flattening device 20 or shifting the taking-up rollers 21 or the feeding rollers 2, or by other means. As a consequence, any suitable extension rate can be obtained longitudinally or transversally. Thus, the optimum extension rate can be obtained easily. Moreover, for films having different thickness and width, a different extension rate can be provided for the same tubular films. The variation can be made without stopping the operation of the device.

According to the device of the present invention, the starting point of extension is fixed, in order to heat partially in a narrow range and quickly with heating air. Further, while extending the film while it is in contact with the guiding members fixed only at both ends in the guiding device, a film of a desirable shape is extended without imparting any unfavorable force to the film during extension. The extension is effected with stability, and film can continuously be extended with safety.

Moreover, in order to extend films while cooling them slowly, after they have been heated by directing heated air at the films, the portion of film becoming thinner by being extended to a higher degree is cooled more rapidly as compared with other portions, while portions which are extended less, and heated to higher temperatures and are thicker are extended. Finally, uniformly extended and consequently uniformly thick films are obtained. Furthermore, the temperatures for heating the films can be controlled so as to be any suitable temperature by controlling the temperature of heating air directed at the films. It is easy to attain a temperature suitable for orientation. Moreover, since the extension is effected simultaneously both in the longitudinal and transverse directions, the properties of the films obtained do not differ in the longitudinal and transverse directions.

What is claimed is:

1. Process for extending tubular films of thermoplastic synthetic resin, comprising the steps of heating a tubular film of thermoplastic synthetic resin to a temperature suitable for orientation, forcing air into the interior of the tubular film and simultaneously extending it in the direction of the length thereof to effect biaxial extension thereof, the steps of heating comprising blowing heated air at the film in a uniform stream against a short length of the tubular film and around the entire periphery thereof, and moving the film in the direction of its length while contacting the external surface thereof with a group of guiding members which are very flexible and are fixed at both ends and are unsupported between the ends, while simultaneously extending the film longitudinally, thereby effecting a biaxial extension.

2. An apparatus for extending tubular films of thermoplastic synthetic resin, comprising means for feeding a flattened tube of said resin in the direction of the length of the tube, means for injecting gas into the tube to inflate it, a pre-heating means along the length of said tube past which said feeding means feeds the tube for heating the plastic resin, a heating means spaced along the length of said path of the film from said pre-heating means and comprising a source of hot gas and a nozzle extending around the film and directed toward the film and having a dimension in the direction of the length of the film which is very small as compared to the length of said pre-heating means, guide means adjacent said heating means and comprising flexible members extending in the direction of the movement of the film and outwardly therefrom and held only at the end for guiding the heated film as it expands outwardly, and take-up means spaced from the guide means in the direction of movement of the film and taking up the film, said takeup means taking up the film at a speed faster than the feed means is feeding the film, whereby the film is extended in the longitudinal as well as the lateral direction.

3. An apparatus as claimed in claim 2 in which said flexible members have one end secured to said nozzle adjacent the nozzle opening therein, and have the other end secured at a point radially outwardly of the point at which the one end is secured and spaced along the direction of movement of the film, the flexible members being positioned at equi-distant points around the periphery of the path of the film.

4. An apparatus as claimed in claim 3 in which said flexible members each have the shape of a trapezoid and the shorter bases thereof are at the nozzle and have spaces between them, and the longer bases have their ends tangent to each other.

5. An apparatus as claimed in claim 3 in which said flexible members are substantially rectangular with one end rounded off, the rounded off ends being at the nozzle, the edges of the flexible members overlapping so that there are no spaces between them.

6. An apparatus as claimed in claim 3 in which the other ends of said flexible members are resiliently mounted for resilient movement of the film.

7. An apparatus as claimed in claim 2 and further comprising cooling gas means spaced from the guide means in the direction of the movement of the film and comprising a source of cool gas and nozzle means around the film and directed toward the film.

References Cited

UNITED STATES PATENTS

| | | | |
|---|---|---|---|
| 1,612,509 | 12/1926 | Henderson et al. | 264—95 |
| 2,047,554 | 7/1936 | Fischer | 264—95 |
| 2,716,777 | 9/1955 | Hagen. | |
| 2,910,961 | 11/1959 | McIntire et al. | |
| 2,955,321 | 10/1960 | Fortner et al. | |
| 3,008,186 | 11/1961 | Voigt. | |
| 3,068,516 | 12/1962 | Hofer. | |
| 3,337,665 | 8/1967 | Underwood et al. | |

WILLIAM J. STEPHENSON, Primary Examiner

U.S. Cl. X.R.

18—1, 14; 264—95